United States Patent [19]

Haas

[11] 3,721,730

[45] March 20, 1973

[54] ALUMINA RECOVERY FROM RETORTED OIL SHALE RESIDUE

[75] Inventor: Frank C. Haas, Arvada, Colo.

[73] Assignee: The Oil Shale Corporation, New York, N.Y.

[22] Filed: Dec. 30, 1970

[21] Appl. No.: 102,930

[52] U.S. Cl. ................423/119, 423/130, 423/131
[51] Int. Cl. ...........................C01f 7/34, C01f 7/14
[58] Field of Search .........23/143; 423/119, 130, 131

[56] References Cited

UNITED STATES PATENTS 3,459,502  7/1969  Van Nordstrand...................23/143

Primary Examiner—M. Weissman
Attorney—Brumbaugh, Graves, Donohue & Raymond

[57] ABSTRACT

Alumina is recovered from a dawsonite-bearing oil shale matrix by treatment of the retorted oil shale residue or spent shale containing fixed carbon with a dilute aqueous soda ash-caustic soda leach liquor having a concentration of from about 5 to about 20 grams per liter of soda ash and from about 8 to about 20 grams per liter of caustic soda in a mole ratio of soda ash to caustic soda of from about 0.1:1 to about 0.9:1 to provide ultimately a high yield of cell-grade alumina substantially free of silica contamination.

6 Claims, No Drawings

ALUMINA RECOVERY FROM RETORTED OIL SHALE RESIDUE

The present invention relates to a process for the recovery of alumina from a dawsonite-bearing oil shale matrix.

Dawsonite is a basic sodium aluminum carbonate having the formula $NaAlCO_3(OH)_2$. This material, until recently, has not been of great importance. However, as the world supply of the chief aluminum-bearing mineral, namely, bauxite, diminishes, there is increasing emphasis on other sources of aluminum-bearing minerals. One such source of aluminum is dawsonite which is found in association with oil shale, quartz, feldspar and other matrixes. Moreover, in view of the increasing world interest in the recovery of oil from oil shale due to the depletion and nationalization of petroleum reserves, there is now a greater demand for making the shale oil extraction process more economically attractive. To this end, attempts have been made to develop an economical method for the recovery of aluminum values present in the dawsonite-bearing oil shale found in the western state of Colorado, and throughout the world.

Previous efforts towards the recovery of aluminum values from dawsonite have met with little success, because they have been uneconomical in view of their dependence upon the use of large concentrations of costly acidic or alkaline leach liquors, and also the use of highly elevated temperatures and pressures during the leaching operation.

One such process which has been proposed heretofore is disclosed in U.S. Pat. No. 3,389,975, wherein retorted dawsonite-bearing oil shale is leached with an aqueous soda ash (sodium carbonate)-caustic soda (sodium hydroxide) leach liquor having a mole ratio of soda ash to caustic soda of at least about 1.5:1 up to 8:1 and providing a sodium to aluminum high atomic ratio of at least about 5:1 up to 60:1 to dissolve the aluminum values which are thereafter precipitated in the form of sodium aluminum carbonate hydroxide. Such a procedure has the drawbacks of also solubilizing appreciable amounts of silica contaminant, of requiring large amounts of sodium-containing reagents and of producing the recovered aluminum values in a form which has to be further processed into the more commercially useful anhydrous alumina form from which aluminum metal may be obtained electrolytically.

A further procedure suggested heretofore is that disclosed in U.S. Pat. No. 3,510,255 wherein a dawsonite-bearing oil shale matrix is pyrolyzed at 750° to 975°F. and then roasted in an oxidizing atmosphere at a higher temperature of 1,000° to 1400°F. to convert the dawsonite to sodium aluminate and to convert the oil shale to shale oil vapors and shale ash, i.e., spent shale from which the fixed carbon has been combusted or burned off, and subsequently the solids blend of sodium aluminate and shale ash is leached with a leach liquor which is water or aqueous soda ash solution or aqueous soda ash-caustic soda solution having a high mole ratio of soda ash to caustic soda of 1.5:1 to 7.5:1 to provide a sodium aluminate solution from which alumina is thereafter precipated. This process, while being highly useful, has the drawback that it requires the roasting of the spent shale product of the pyrolysis of oil shale so as to burn off or combust the fixed carbon content thereof and thereby provide a product, namely, shale ash, which can be satisfactorily treated with the leach liquor. Moreover, such a process requires a high mole ratio of soda ash to caustic soda when caustic soda is used in the leach liquor, which, together with the alkaline material produced during roasting, has the drawback of increasing the soluble silica contaminant content of the leach liquor to high values, e.g., in the range of 0.12 to 0.22 grams of silica per liter, and adversely effecting the purity of the alumina product.

It is, therefore, the object of the present invention to provide an economical process for the recovery of high purity alumina in high yield from dawsonite-bearing oil shale which will not suffer from the drawbacks of the processes suggested heretofore.

In accordance with the process of the present invention, ground oil shale containing dawsonite (usually varies from 5 to 30 percent thereof) is pyrolyzed at a temperature of from about 750°F. to about 975°F., preferably from about 850°F. to about 950°F., to yield shale oil hydrocarbonaceous vapors and a solids blend of spent shale containing residual or fixed carbon, e.g., usually from 3 to 5 percent up to as high as 10 percent by weight, and sodium aluminate ($NaAlO_2$). The sodium aluminate is formed from the dawsonite during its heating to temperatures of about 660°F. or higher. The pyrolysis of the dawsonite-bearing oil shale can be conducted during a period ranging from several minutes to several hours using conventional retort chambers or pyrolyzers such as fluid beds, rotary and stationary kilns and the like. Generally, the heat of pyrolysis or retorting is provided by hot solid heat exchange bodies such as sand, shale ash, metal or ceramic balls, and the like.

The shale oil vapors are separated from the solids blend of spent shale and sodium aluminate, for example, by withdrawing them through separate educt units of the retort or pyrolyzer. The shale oil vapors made up of gaseous and vaporous hydrocarbons are treated in a recovery unit.

The solids blend of spent shale and sodium aluminate is leached with a leach liquor at a temperature of from about 70°F. to about 212°F., and preferably at a temperature of from about 120°F. to about 170°F., for from about 1 to about 60 minutes, preferably for from about 5 to about 15 minutes. The leach liquor is a dilute aqueous soda ash-caustic soda solution having a concentration of from about 5 to about 20 grams per liter of soda ash (or from about 0.5 percent to about 2 percent by weight thereof) and from about 8 to about 20 grams per liter of caustic soda (or from about 0.8 percent to about 2 percent by weight thereof). Recycle leach liquor can also be used. The mole ratio of soda ash to caustic soda in the leach liquor is from about 0.1:1 to about 0.9:1 and preferably is from about 0.2:1 to about 0.4:1. This mole ratio is highly significant, because it has been found that lower and higher mole ratios result in poor alumina extraction and/or in high contamination of the alumina with silica. The solids content during the leaching operation is from about 5 percent to about 50 percent by weight. The pH of the leach liquor during the leaching operation is maintained at an alkaline value of from about 11 to about 13. The leaching affects the extraction of the alkali-soluble sodium aluminate from the solids blend to provide a sodium aluminate solution which usually contains only very small amounts of contaminating solubilized silica, e.g., about 0.02 grams of silica per liter or appreciably less.

The sodium aluminate solution resulting from the leaching operation is separated from the spent shale solids by any suitable means, such as by filtration, decantation, centrifugation, settling, and the like The sodium aluminate solution and/or the recycle leach liquor can be desilicated to remove solubilized silica therefrom by seeding the solution with sodalite or noselite, although such procedure is in most instances not necessary because of the low solubilized silica content thereof.

The sodium aluminate solution is then treated, for example, at from about 77°F. to about 158°F., with at least a stoichiometric amount of carbon dioxide to form thereby an alumina hydrate precipitate and a supernatant liquor containing water-soluble sodium carbonate by-product. The rate of precipitation can be increased by seeding the solution with alumina trihydrate. The alumina hydrate precipitate is thereafter separated from the supernatant liquid by suitable separation means, such as those mentioned above.

The separated alumina hydrate product [$Al_2O_3 \cdot 3H_2O$ or $2 Al(OH)_3$] can be thereafter dried and calcined, e.g., at 950°C. for 30 minutes, to provide anhydrous cell-grade alumina ($Al_2O_3$) suitable for use in the electrolytic production of aluminum metal.

The process is highly useful in that it results in an alumina recovery or extraction of at least about 70 percent and usually about 80 to 90 percent or higher without significant silica contamination of the alumina.

The process of the invention will be illustrated further by the following data and examples.

EXAMPLES 1–19

The process disclosed above in detail was conducted wherein the mole ratio of soda ash ($Na_2CO_3$) to caustic soda (NaOH) in the leach liquor was varied appreciably. The amount of dissolved silica impurities in the leach liquor was determined as well as the percent alumina extracted from the pyrolyzed dawsonite-bearing oil shale. The data thereon are reported below in Table I wherein Examples 1–11 are illustrative of the process of the invention and in Table II wherein Examples 12–19 are comparative examples of processes outside the scope of the present invention because of the mole ratio of soda ash to caustic soda used in the leach liquors thereof.

Table III presents the product analysis for Example 7. The pregnant leach liquor of Example 7 was carbonated with $CO_2$ at 70°C for 2 hours in the presence of aluminum trihydrate seeds to precipitate the aluminum as aluminum hydroxide. The precipitate was calcined to form the very pure alumina product presented in Table III.

TABLE I

| Example No. | Leach Solution g. $Na_2CO_3$/l.- g. NaOH/l. | Mole Ratio $Na_2CO_3$:NaOH | % alumina Extracted | dissolved impurities (grams $SiO_2$/liter) |
|---|---|---|---|---|
| 1 | 5 – 15 | 0.13:1 | 82 | 0.021 |
| 2 | 5 – 10 | 0.19:1 | 75 | 0.002 |
| 3 | 10 – 18 | 0.21:1 | 90 | 0.020 |
| 4 | 10 – 15 | 0.25:1 | 92 | 0.011 |
| 5 | 7 – 10 | 0.26:1 | 72 | 0.004 |
| 6 | 10 – 13 | 0.29:1 | 86 | 0.011 |
| 7 | 10 – 10 | 0.38:1 | 85 | 0.010 |
| 8 | 13 – 10 | 0.49:1 | 79 | 0.008 |
| 9 | 15 – 10 | 0.57:1 | 79 | 0.009 |
| 10 | 20 – 10 | 0.75:1 | 84 | 0.021 |
| 11 | 20 – 8.5 | 0.89:1 | 84 | 0.010 |

TABLE II

| Example No. | Leach Solution g. $Na_2CO_3$/l.- g. NaOH/l. | Mole Ratio $Na_2CO_3$:NaOH | % alumina Extracted | dissolved impurities (grams $SiO_2$/liter) |
|---|---|---|---|---|
| 12 | 50 – 0 | ∞ | 43 | 0.013 |
| 13 | 5 – 0 | ∞ | 37 | 0.005 |
| 14 | 20 – 3.75 | 2.16:1 | 39 | 0.04 |
| 15 | 20 – 5.0 | 1.51:1 | 43 | 0.01 |
| 16 | 20 – 7.5 | 1.00:1 | 54 | 0.01 |
| 17 | 5 – 20 | 0.09:1 | 96 | 0.036 |
| 18 | 5 – 25 | 0.08:1 | 70 | 0.047 |
| 19 | 5 – 30 | 0.06:1 | 67 | 0.064 |

TABLE III

PRODUCT ANALYSIS OF EXAMPLE 7

| | |
|---|---|
| $Al_2O_3$ | 99.8734 (by difference) |
| Mg | 0.0010 |
| Mn | 0.0001 |
| Pb | 0.0015 |
| Fe | 0.0300 |
| Sn | 0.0015 |
| Cu | 0.0015 |
| Na | 0.0700 |
| B | 0.0010 |
| $SiO_2$ | 0.0200 |
| Total | 100.00 |

The data set forth above in Tables I and II clearly demonstrate the criticality of using an aqueous soda ash-caustic soda leach liquor which has a mole ratio of soda ash to caustic soda of from about 0.1:1 to about 0.9:1 and preferably from about 0.2:1 to about 0.4:1. Thus, in Examples 1–11 and particularly Examples 3–7 of Table I illustrating the process of the invention wherein such mole ratios were employed, the percent alumina extracted ranged from a satisfactory value of 72 percent up to a remarkable value of 92 percent. Equally important is the concomitant fact that the dissolved silica contaminant in the leach liquor was present therein in an amount of only about 0.02 grams per liter down to 0.002 grams per liter. However, in comparative Examples 12–19 in Table II where the requisite mole ratio of soda ash to caustic soda was not employed, the data obtained were not satisfactory. Thus, in comparative Examples 12–16 wherein the mole ratio was varied from 1.0:1 to infinity and was too high because of the relatively small amount and even absence of caustic soda in the leach liquor, only a small amount of dissolved silica contaminant was usually present in the leach liquor but more significantly the percent alumina extracted was very poor and uneconomical in that it ranged from low values of only 37 to 54 percent. In comparative Examples 17–19 the mole ratio of soda ash to caustic soda was lower (0.06:1 to 0.09:1) than the requisite values for the process of the invention (0.1:1 to 0.9:1) and although satisfactory alumina extraction was obtained, namely, from 67 to 96 percent, more significantly the dissolved silica contaminant in the leach liquor and hence carried forward or occluded in the alumina precipitate was excessively high and appreciably above 0.02 grams of silica per liter, namely, from 0.036 to 0.064 grams of silica per liter.

The foregoing data vividly establish that the process of the invention results in the high yield extraction of alumina from dawsonite-bearing oil shale without significantly contaminating the alumina with undesirable silica impurities and does so without the necessity of the expense and time involved in having to roast spent shale from the retorting of oil shale to burn off or combust the residual carbon in the spent shale and thereby convert it to shale ash before the leaching step can be performed on the shale ash rather than on the spent shale. Moreover, the process can be performed without the necessity of desilicating the sodium aluminate solution and/or the recycle leach liquor and the process directly provides the extracted aluminum values in the form of highly useful alumina rather than in the form of less commercially important sodium aluminum carbonate hydroxide.

Various modifications and changes in the process of the invention in addition to those pointed out above can be readily made by those skilled in the art without departing from the essence of the invention and accordingly the invention is to be limited only within the scope of the appended claims.

What is claimed is:

1. A process for recovering alumina from a dawsonite-bearing oil shale matrix which comprises:
   1. pyrolyzing oil shale containing dawsonite to yield shale oil vapors and a solids blend of spent shale containing fixed carbon and sodium aluminate;
   2. separating the shale oil vapors from the solids blend;
   3. leaching the solids blend at a solids content of from about 5 percent to about 50 percent by weight with a dilute aqueous soda ash-caustic soda leach liquor having a concentration of from about 5 to about 20 grams per liter of soda ash and from about 8 to about 20 grams per liter of caustic soda in a mole ratio of soda ash to caustic soda of from about 0.1:1 to about 0.9:1 to extract the sodium aluminate from the solids blend and provide a sodium aluminate solution;
   4. separating the sodium aluminate solution from the spent shale solids;
   5. adding carbon dioxide to the sodium aluminate solution to form an alumina hydrate precipitate and a supernatant liquor; and
   6. separating the alumina hydrate precipitate from the supernatant liquor.

2. The process as defined by claim 1 wherein the pyrolysis step (1) is conducted at a temperature of from about 750°F. to about 975°F.

3. The process as defined by claim 1 wherein the leaching step (3) is conducted at a temperature of from about 70°F. to about 212°F. for from about 1 to about 60 minutes.

4. The process as defined by claim 1 wherein the dilute aqueous soda ash-caustic soda leach liquor used in step (3) has a mole ratio of soda ash to caustic soda of from about 0.2:1 to about 0.4:1.

5. The process as defined by claim 1 wherein the pH of the leach liquor during the leaching step (3) is maintained at from about 11 to about 13.

6. A process for recovering alumina from a dawsonite-bearing oil shale matrix which comprises:
   1. pyrolyzing oil shale containing dawsonite at a temperature of from about 850°F. to about 950°F. to yield shale oil vapors and a solids blend of spent shale containing fixed carbon and sodium aluminate;
   2. separating the shale oil vapors from the solids blend;
   3. leaching the solids blend at a temperature of from about 120°F. to about 170°F. for from about 5 to about 15 minutes with a dilute aqueous soda ash-caustic soda leach liquor maintained at a pH of from about 11 to about 13 and having a concentration of from about 5 to about 20 grams per liter of soda ash and from about 8 to about 20 grams per liter of caustic soda in a mole ratio of soda ash to caustic soda of from about 0.2:1 to about 0.4:1, at from about 5 percent to about 50 percent solids content, to extract the sodium aluminate from the solids blend and provide a sodium aluminate solution;
   4. separating the sodium aluminate solution from the spent shale solids;
   5. adding carbon dioxide to the sodium aluminate solution to form an alumina hydrate precipitate and a supernatant liquor; and
   6. separating the alumina hydrate precipitate from the supernatant liquor.

* * * * *